United States Patent [19]

Bianco et al.

[11] Patent Number: 5,048,086

[45] Date of Patent: Sep. 10, 1991

[54] ENCRYPTION SYSTEM BASED ON CHAOS THEORY

[75] Inventors: Mark E. Bianco, Diamond Bar, Calif.; Dana A. Reed, Castle Rock, Colo.

[73] Assignee: Hughes Aircraft Company, Los Angeles, Calif.

[21] Appl. No.: 553,030

[22] Filed: Jul. 16, 1990

[51] Int. Cl.$^5$ .............................................. H04L 9/28
[52] U.S. Cl. ........................................ 380/28; 380/9; 380/46; 380/50
[58] Field of Search ..................... 364/200, 900; 380/6, 380/9, 28, 43, 46, 49, 50, 59, 29–30

[56] References Cited

U.S. PATENT DOCUMENTS 5,007,087 4/1991 Bernstein et al. ................... 380/46

OTHER PUBLICATIONS

Robert Matthews, "On the Derivation of a Chaotic Encryption Algorithm"; Cryptologia, (Jan., 1989; vol. XIII, No. 13, pp. 29–42).

*Primary Examiner*—Bernarr E. Gregory
*Attorney, Agent, or Firm*—Robert A. Westerlund; Steven M. Mitchell; Wanda K. Denson-Low

[57] ABSTRACT

An encryption system and method based on the mathematics of Chaos theory, which provides protection of data from unauthorized modification and use during its storage and transmission. At its core are nonlinear equations which exhibits random, noise-like properties, given certain parameter values. When iterated, a periodic sequence is produced with an extremely long cycle length. A domain transformation process is then used to convert the floating-point iterates into binary form for summation with the digital data to be protected. The result is an encrypted message that cannot be modified, replaced, or understood by anyone other than the intended party. The use of Chaos theory in combination with the domain transformation process results in an easily implemented cryptographic system with extremely robust cryptographic properties. The concepts of the present invention also lend themselves well to either hardware or software implementations. The cryptographic system of the present invention may be employed to encrypt and decrypt sensitive information, to authenticate data and video links, or similar applications. It can also be used to provide a simple hash function for the secure storage of passwords in a computer system. Its simplicity, requiring only floating-point operations at its core, allows a lower cost and higher performance product with cryptographic security equivalent to conventional cryptographic systems.

14 Claims, 3 Drawing Sheets

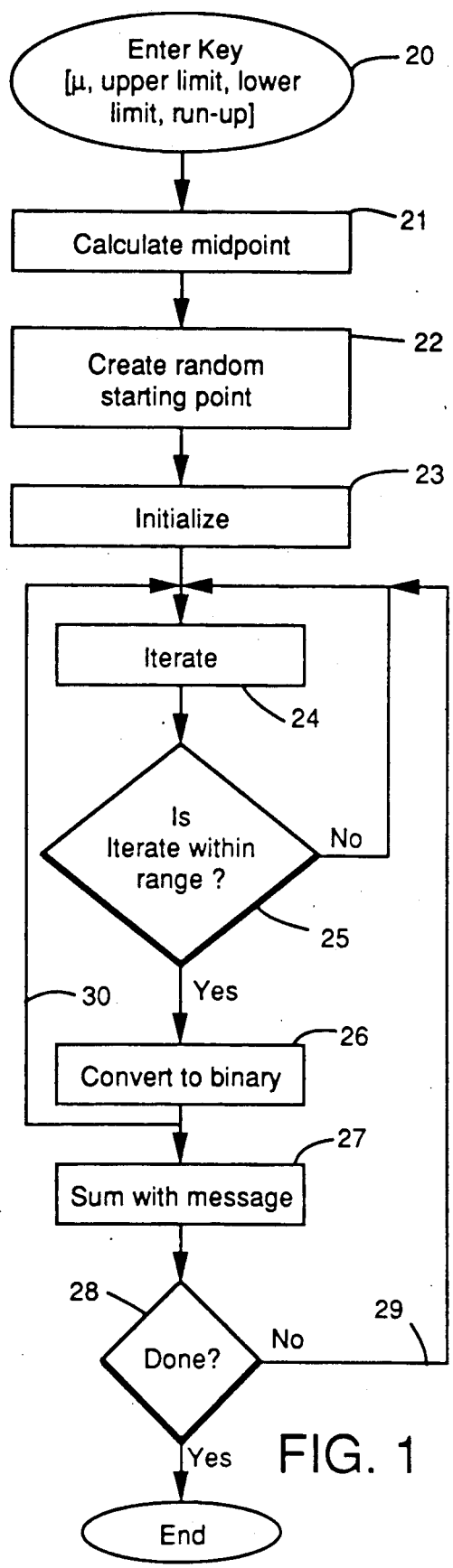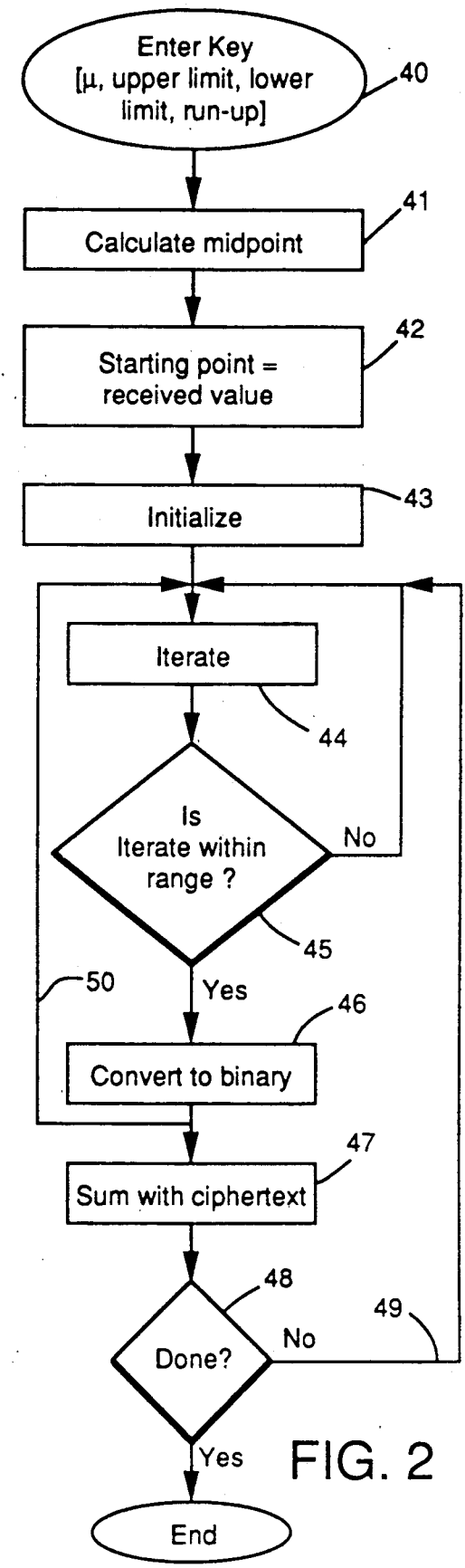

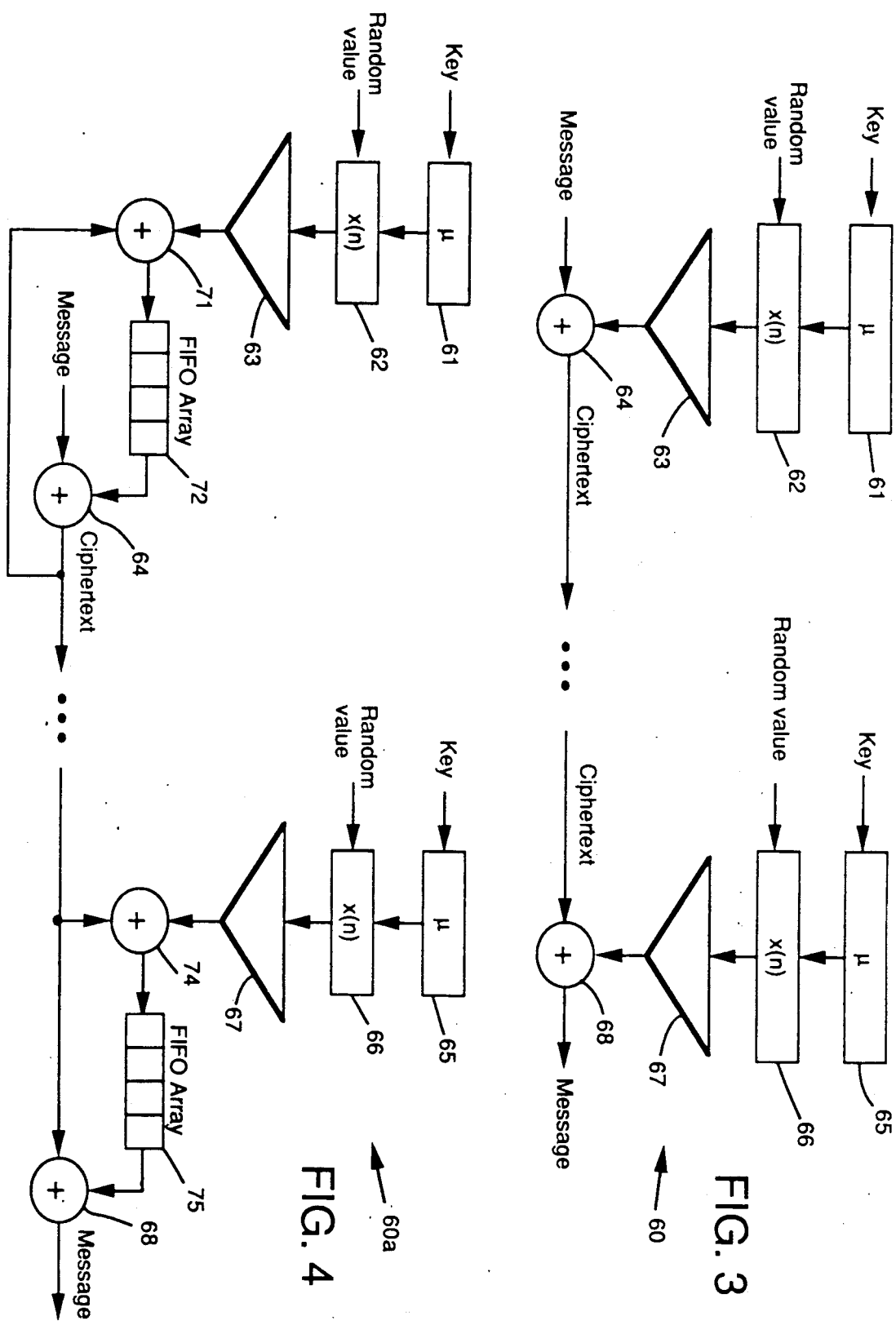

ENCRYPTION SYSTEM BASED ON CHAOS THEORY

BACKGROUND

The present invention relates generally to encryption systems, and more particularly, to an encryption system that is implemented using the concepts of Chaos theory.

Cryptography is the science of protecting information from eavesdropping and interception. The two principle objectives are secrecy (to prevent unauthorized disclosure) and integrity (to prevent unauthorized modification). A number of products are available to provide this protection, but they tend to be complex and slow, or fast but cryptographically not very robust. The Data Encryption Standard (DES) is one example of a robust algorithm, however its software implementations are slow due to its complexity, and its hardware implementations require complex devices. Proprietary algorithms have also been used, however their strength is not always verifiable since design details are usually not publicly disclosed. In addition, complex algorithms require significant human and computing resources to prove their strength, and even then hidden weaknesses are occasionally discovered at a later time. The present invention overcomes these problems.

The DES and Rivest Shamir Aldeman (RSA) cryptographic systems are the best known and most widely used products available for comparison. The Data Encryption Standard and the present invention perform similar functions and can generally be used in the same applications. The DES is available in either hardware or software versions, allowing flexibility for the application developer. The disadvantage with software versions of the DES is that it algorithm is based on a complex state machine, and state machines do not translate well into software. Computers are much better suited to operations on 8-, 16-, or 32-bit words, and DES requires intensive operations at the individual bit level. One DES implementation that was tested required the execution of about 5,000 high-level software statements, which is unnecessarily high.

The RSA algorithm can likewise be implemented in software or hardware, although hardware is the most common, since its processes rely on complicated mathematics which execute too slowly in software for most applications. In addition to its slow speed, another disadvantage is that while being considered computationally secure today, it may not be in the future. Its strength is based on the computationally difficult problem of factoring large prime numbers. If a more efficient algorithm were to be discovered, its security could be weakened. Since this invention cannot be reduced to such a simple mathematical function, it represents a more robust system. The present invention overcomes the problems associated with the Data Encryption Standard and RSA cryptographic systems.

SUMMARY OF THE INVENTION

This invention is an encryption system based on the mathematics of Chaos theory, which provides protection of data from unauthorized modification and use during its storage and transmission. At its core is a nonlinear equation which exhibits random, noise-like properties when certain parameters are used. In particular, one such nonlinear equation is the logistic difference equation: $x_{n+1} = \mu x_n (1 - x_n)$, which is chaotic for certain values of $\mu$, wherein $\mu$ acts as a tuning parameter for the equation. When iterated, a periodic sequence is produced with an extremely long cycle length. A domain transformation process is then used to convert the floating-point iterates into binary form for summation with the digital data to be protected. The result is an encrypted message which cannot be modified, replaced, or understood by anyone other than the intended party. The use of Chaos theory in combination with the domain transformation process results in a cryptographic system with extremely robust cryptographic properties.

A simple mathematical formula with complex properties is used instead of a complex state machine with complex properties. This allows faster operation, while at the same time reduces the possibility of a hidden or undiscovered cryptographic weakness. In addition, knowledge of the algorithm does not simplify recovery of the key. In fact, even when the conditions most favorable to a cryptanalyst are allowed, key protection is maintained when other more conventional systems would be broken. This is made possible by a unique one-way domain transformation process which results in the loss of information critical to the cryptanalyst's success. The combination of these techniques results in a cryptographic system that is extremely simple to implement, yet is cryptographically very robust. It also lends itself well to either a hardware or software implementation.

The cryptographic system of the present invention may be employed to protect sensitive information, or to authenticate data and video links, or to support secure computer systems, or similar applications. It can also be used to provide a simple hash function for the secure storage of passwords in a computer system. Its simplicity, requiring only floating-point operations at its core, allows a lower cost and higher performance product with cryptographic security equivalent to the most widely used cryptographic systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a flowchart showing an encryption process in accordance with the principles of the present invention;

FIG. 2 is a flowchart showing a decryption process in accordance with the principles of the present invention;

FIG. 3 is a diagram showing an encryption and decryption system without error extension in accordance with the principles of the present invention;

FIG. 4 is a diagram showing an encryption and decryption system with error extension in accordance with the principles of the present invention.

DETAILED DESCRIPTION

Figure 5:
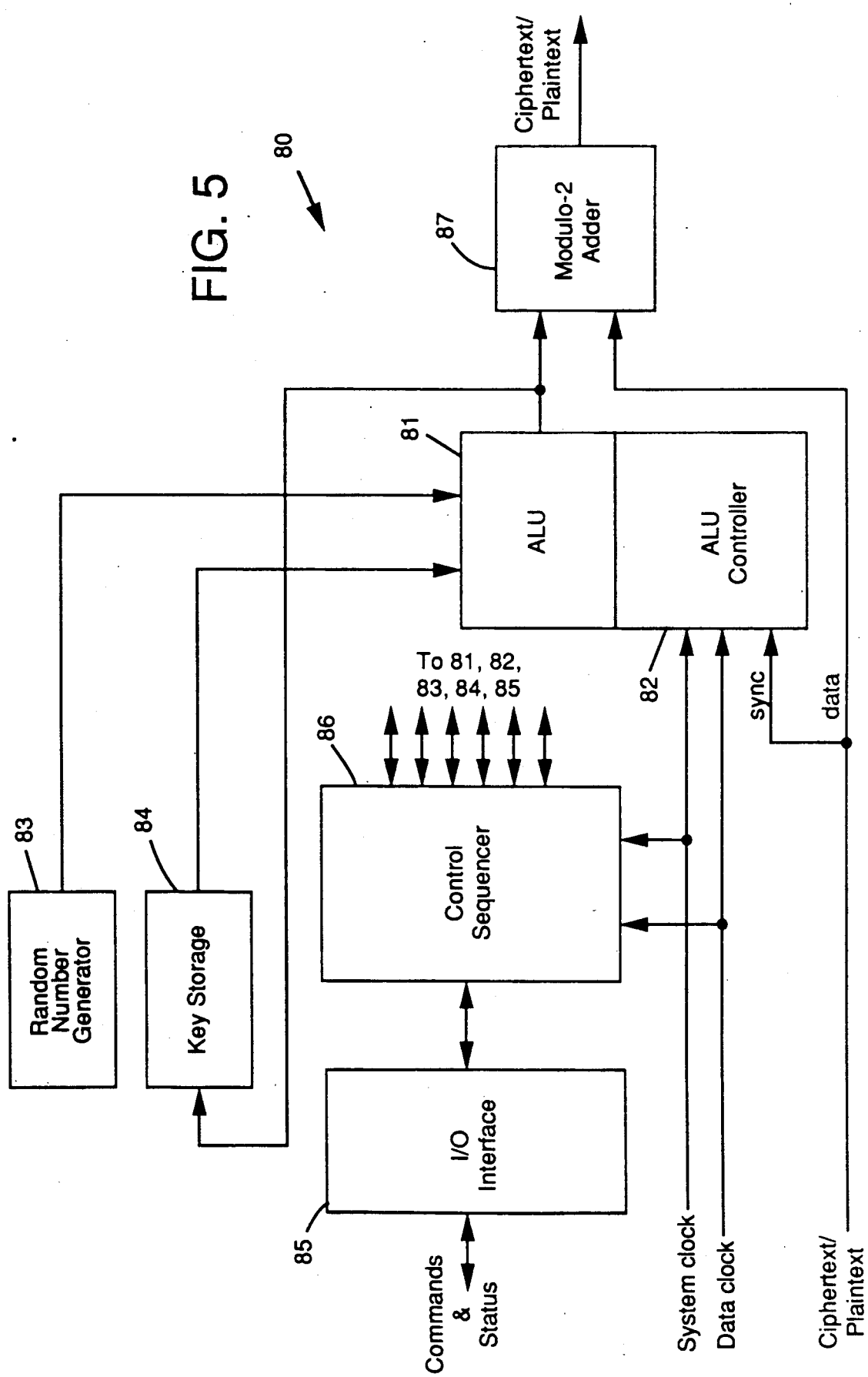
FIG. 5 is a functional block diagram of the encryption and decryption system in accordance with the principles of the present invention.

By way of introduction, Chaos theory is an evolving field of mathematics that studies the behavior of nonlinear systems. When properly initialized, these systems exhibit chaotic behavior when iterated. Chaotic behavior may be described as a form of steady state behavior which is aperiodic and as such appears to have noise-like characteristics. This behavior, although aperiodic, is bounded, and while the chaotic trajectory never exactly repeats itself, the trajectory is completely deterministic given the exact initial conditions and parameter values. These chaotic properties are used to generate an aperiodic sequence for use as the keystream in the encryption system of the present invention.

It is useful to draw an analogy with a common linear sequence generator. Both the present invention and the linear sequence generator produce pseudo-random sequences from a given starting point, and both have a finite cycle length. However, the frequency spectrum of a chaotic system is continuous and broadband, whereas the linear sequence generator is discrete. This property offers significant advantages when used in an encryption system, since its statistical properties are more noise-like when small sections of the entire state space are considered. For example, the statistical performance of a 1,000 bit sample taken from a linear sequence generator with 10 million states will not appear very noise-like due to the small percentage of available states used. A chaotic system under the same conditions would appear more noise-like.

The logistic difference equation is one of the simplest nonlinear functions which exhibits chaotic characteristics, and is the first of two processes used in the present invention. Although this function is used in the following description, it is only one of a number of functions with similar properties. The concepts of the present invention permit any of this entire class of functions to be used. The logistic difference equation is defined as: $x_{n+1} = \mu x_n(1-x_n)$, where $\mu$ is a constant between 0.0 and 4.0 and x is the iterated result between 0.0 and 1.0. Approximately 90% of $\mu$ values between 3.57 and 4.0 result in chaotic behavior, and the particular value selected remains constant throughout the iterations. An initial value of $x_n$ is chosen to begin the process. An extremely minor change to this initial value will result in a completely different sequence; 0.1000000000 will produce a different sequence than 0.1000000001. The initial values simply determine different starting positions in the same very long sequence for any given value of $\mu$.

It has been mathematically proven that operation in the chaotic region will produce an aperiodic sequence, making it appear as if an infinite cycle length can be obtained. Reference is hereby made to the thesis by Dana Reed entitled "Spectrum Spreading Codes from the Logistic Difference Equation," submitted to the Department of Electrical Engineering and Computer Science at the University of Colorado, having a reference number of LD1190.E54 1989M R43, which describes that operation in the chaotic region produces such an aperiodic sequence.

In practice, however, the floating-point precision of the machine implementation determines the maximum cycle length that is available. With the 12-digit precision typically available on most computers, the maximum cycle length would be on the order of $10^{12}$ iterates. An IBM-PC with a math coprocessor could produce about $10^{19}$ iterates. Due to the number of variable parameters, however, it is extrememly difficult to determine an exact cycle length. This has both advantages and disadvantages for an encryption application. For comparison, the Data Encryption Standard has a cycle length of about $10^{16}$ states. To illustrate the magnitude of these numbers, a system implementing this algorithm and operated continuosly at a 1 Megabit/sec rate would not repeat for 11.6 days with $10^{12}$ iterates, and for 317,000 years with $10^{19}$ iterates. Given the same conditions, the Data Encryption Standard would not repeat for 317 years. This illustrates the flexibility of the present invention, since extremely long cycle lengths can be obtained by simply increasing the precision of the implementation.

Two characteristics of the above logistic difference equation allow it to be used within an encryption system. First, for any given $\mu$ and $x_n$, the logistic difference equation deterministically generates an extremely large number of uniformly distributed iterates. This allows a decryptor to easily obtain synchronization with the encryptor, and the uniform statistical distribution increases the robustness of the encrypted data against recovery by cryptanalysis. Second, changing the value of $\mu$ or x will result in a totally different sequence, allowing $\mu$ to be used as the "key" and $x_n$ as the "preamble".

The second function used in the present invention is a domain transformation process. Since the logistic difference equation produces real numbers between 0.0 and 1.0, its iterates must be converted to a binary 0 or 1 before encryption of digital data can take place. This is accomplished with a two-stage numerical filter process. The first stage limits the range of iterate values to be used and the second stage converts them into a binary 0 or 1. Iterates between the lower limit and midrange are converted into 0's, and iterates between the midrange and upper limit are converted into 1's. This is essentially a transformation from the continuous domain to the discrete domain, which is an irreversible process.

This transformation results in significantly greater cryptographic strength than use of the logistic difference equation alone. For example, by passing only those values between 0.4 and 0.6 to the second stage, a significant number of intermediate iterates will never become part of the keystream. Due to the irreversible nature of this transformation and the use of a discontinuous number of iterates, the actual $x_n$ values cannot be recovered from knowledge of the binary keystream. By denying a cryptanalyst of this information, the work factor required to recover the message or its key from the transmitted data increases to the point of computational infeasibility. The number of variables involved also allow the iterates to be periodically perturbed, effectively adding another discontinuity to further complicate cryptanalysis.

Due to the nature of the present invention, a software implementation thereof is a natural choice. Any computer capable of floating-point operations can be used. The optional use of a math coprocessor offers the benefit of increased execution speed, and its higher precision increases the effective state space. Flowcharts of the encryption and decryption processes, and a system diagram of a typical implementation are shown in FIGS. 1, 2, and 3, respectively, and an implementation in the Pascal language is provided in Appendix I hereto.

With reference to FIG. 1, which illustrates the encryption sequence of the present invention, the parameter $\mu$, the upper and lower limits of the iterate range, and an initialization count (run-up) are supplied as the "cryptographic key" in step 20. The midpoint between the upper and lower limits is then calculated in step 21 for later use by the domain transformation process. A random starting point is then created in step 22 which is nonrepeatable and nonpredictable between encryption sessions. This will be the initial value of $x_n$, and is saved so that it can be prepended to the following encrypted message. Examples are the time and date when encryption is initiated, or a variety of system-specific parameters previously agreed upon by the encryptor and decryptor. The equation is then iterated in step 23 for the run-up amount specified in the key to determine the initial starting point. The next iterate is then generated in step 24 and tested in step 25 to determine if it is within the specified range. If so, it is converted into a binary 0 or 1 in step 26, otherwise it is ignored and a new iterate is calculated and tested by repeating steps 24 and 25. The resulting binary value is summed modulo-2 in step 27 with one bit of plain text (data to be encrypted), creating a ciphertext bit which can either be stored or immediately output. This process is repeated until the entire message has been encrypted as indicated by the decision block 28 and loop 29. Although this description performs encryption on a bit-for-bit basis, multiple-bit words may also be encrypted by repeating steps 24, 25, and 26 an appropriate number of times before summing with a multiple-bit block of the message. This is illustrated by loop 30 in FIG. 1. For example, an 8-bit byte may be encrypted by generating 8 bits of keystream, then performing step 27 only once.

The decryption process is similar. With reference to FIG. 2, the cryptographic key is loaded in step 40 and the midpoint is calculated in step 41. Using encryptor randomization based on the time and date, for example, the initial value of $x_n$ will be received with the encrypted message as indicated in step 42. Using system-specific parameters, the initial value may either be transmitted with the message or calculated independently by the receiver according to the agreed upon procedure. As before, the equation is initialized and iterated the proper number of times as indicated by steps 43, 44, and 45, followed by generation of the keystream by converting the iterates to binary, as shown in step 46. When modulo-2 summed with the ciphertext in step 47, the original message is recovered. The multiple-bit word decryption steps are illustrated by loop 50 which corresponds to loop 30 in FIG. 1.

A typical software implementation is provided in Appendix I hereto. The same procedure may be used for encryption and decryption, depending on whether the plain message of ciphertext is used for "data".

FIG. 3 illustrates an implementation of an encryption and decryption system 60. The system 60 uses a cryptographic key 61 and a randomly created initial value 62 within a keystream generator 63 comprised of the logistic difference equation and domain transformation process. The output of the process 63 is coupled to a modulo-2 adder 64 that combines the message to be encrypted with a binary value generated by the keystream generator 63 to produce encrypted ciphertext. The ciphertext is then communicated to the decryption portion of the system 60. The cryptographic key 65 and received initial value 66 are used by a keystream generator 67 comprising the logistic difference equation and domain transformation process. The output of the keystream generator 67 is coupled to a modulo-2 adder 68 that combines the message to be decrypted with the binary value generated by the keystream generator 67 to recover the original message.

The above-described system 60 and methods have no error extension, so that a single bit error in the received ciphertext results in one incorrect bit in the decrypted message. A minor modification to the system 60 and its processes, however, provide an error extending mode of operation. A diagram of this modified system 60a is shown in FIG. 4. Keystream bits are fed sequentially into a first-in-first-out array 72 by way of a modulo-2 adder 71, instead of being immediately used. As each bit of the message is encrypted, the ciphertext is modulo-2 added with a new keystream bit and fed back into the array. After a short delay, it is then modulo-2 summed again with another bit of the message. Similarly, the decryption portion of the system 60a also includes an additional adder 74 and a FIFO array 75, which operate as described above. In this case, a single bit error in the received ciphertext will result in a number of errors as it propagates through the array. For example, a 4-element array produces 16 errors for each ciphertext bit. Assuming that the following ciphertext is received error-free, recovery of the original message then continues.

Implementing the above-described algorithm in hardware offers the benefits of increased speed and greater protection against reverse engineering and unauthorized modification. Any hardware implementation may be used, including off-the-shelf microprocessors and digital signal processors, gate arrays, programmable logic devices, or full custom integrated circuits. For descriptive purposes, only the gate array option is discussed below. It performs all of the functions previously discussed, and its arithmetic logic unit may be customized in a conventional manner to provide the desired level of floating point precision. A functional block diagram of the hardware system 80 is shown in FIG. 5. At its core is an arithmetic logic unit 81 capable of floating point operations to the precision desired. An arithmetic logic unit controller 82 implements the necessary control logic in a conventional manner to iterate a variety of predefined chaotic equations, and provides the numerical filter and binary conversion functions. Since the arithmetic logic unit 81 needs to produce many iterates for each keystream bit when narrow filters are used, a separate system clock at an operating frequency greater than the data clock is provided to maintain high encryption rates. The remaining portions of the system 80 provide support functions, and include a randomizer 83, key storage memory 84, an I/O interface 85, a control sequencer 86 and a modulo-2 adder 87. However, it is the arithmetic logic unit 81 and arithmetic logic unit controller 82 which implement the functions performed by the present invention. The I/O interface 85 communicates with a host processor (not shown), and the control sequencer 86 directs the overall operations of the system 80. The key storage memory 84 is provided to store multiple keys, and the randomizer 83 provides random number generation for algorithm initialization.

The same system 80 may be used for both encryption and decryption since the process is symmetric. As mentioned above, I/O configurations and the randomization process are not specified herein since they are specific to each particular host system. Although the algorithm is best suited to processing serial data, a parallel architecture may be implemented by including the appropriate serial-to-parallel converters.

A software program embodying this invention was developed to investigate its properties. All critical functions and processes claimed herein were implemented, and encryption and decryption of sample messages were successfully demonstrated. In addition, a variety of standard statistical tests were performed on samples of 1 million keystream bits, using many combinations of the variable parameters. Tables 1 and 2 illustrate the distributions of typical 1 million bit samples. They indicate that the keystreams were statistically unbiased, and that totally different keystreams were obtained from minor changes to the initial conditions. Auto-correlation and cross-correlation tests were also performed, which confirmed that the keystreams were indeed nondeterministic. For comparison, Table 3 illustrates the performance of a standard Department of Defense (DoD) randomizer that uses a random physical process as its noise source. It is clear that the performance of the present invention compares favorably. This randomness is an essential property of all cryptographically robust encryption systems.

TABLE 1

$\mu = 3.9996$, $x = 0.1$, $\chi^2 = 216.2$
lower limit = 0.49, upper limit = 0.51
Mono bit = 0.5000 First Delta = 0.4998 Second Delta = 0.4999 Third delta = 0.5003

|     | 0:  | 1:  | 2:  | 3:  | 4:  | 5:  | 6:  | 7:  | 8:  | 9:  | A:  | B:  | C:  | D:  | E:  | F:  |
| --- | --- | --- | --- | --- | --- | --- | --- | --- | --- | --- | --- | --- | --- | --- | --- | --- |
| 0:  | 509 | 479 | 472 | 476 | 460 | 467 | 518 | 480 | 496 | 498 | 467 | 507 | 512 | 501 | 501 | 446 |
| 10: | 508 | 475 | 508 | 499 | 488 | 465 | 487 | 501 | 493 | 495 | 496 | 486 | 461 | 532 | 487 | 452 |
| 20: | 488 | 500 | 465 | 489 | 499 | 454 | 488 | 475 | 496 | 501 | 505 | 467 | 495 | 497 | 505 | 456 |
| 30: | 478 | 473 | 456 | 476 | 481 | 534 | 513 | 488 | 489 | 476 | 505 | 509 | 499 | 476 | 520 | 478 |
| 40: | 509 | 480 | 505 | 488 | 487 | 500 | 458 | 478 | 484 | 483 | 442 | 464 | 507 | 519 | 479 | 540 |
| 50: | 476 | 484 | 484 | 461 | 481 | 514 | 470 | 462 | 455 | 477 | 482 | 450 | 472 | 470 | 471 | 492 |
| 60: | 475 | 502 | 480 | 495 | 490 | 521 | 456 | 501 | 475 | 465 | 519 | 475 | 462 | 515 | 500 | 465 |
| 70: | 504 | 508 | 493 | 489 | 466 | 502 | 499 | 503 | 515 | 487 | 468 | 525 | 512 | 496 | 502 | 442 |
| 80: | 486 | 505 | 484 | 548 | 500 | 459 | 515 | 465 | 491 | 487 | 488 | 468 | 476 | 467 | 502 | 499 |
| 90: | 495 | 484 | 475 | 501 | 483 | 506 | 500 | 492 | 489 | 480 | 502 | 475 | 486 | 488 | 520 | 496 |
| A0: | 480 | 477 | 482 | 479 | 489 | 446 | 534 | 450 | 491 | 490 | 518 | 494 | 512 | 459 | 470 | 482 |
| B0: | 466 | 495 | 495 | 487 | 490 | 529 | 504 | 472 | 513 | 493 | 504 | 500 | 463 | 486 | 504 | 481 |
| C0: | 510 | 457 | 489 | 515 | 456 | 510 | 484 | 481 | 525 | 520 | 500 | 502 | 502 | 477 | 481 | 495 |
| D0: | 504 | 522 | 460 | 491 | 478 | 514 | 488 | 488 | 465 | 480 | 497 | 522 | 516 | 511 | 477 | 468 |
| E0: | 478 | 464 | 467 | 460 | 485 | 467 | 507 | 484 | 522 | 487 | 470 | 497 | 424 | 498 | 498 | 496 |
| F0: | 518 | 443 | 456 | 476 | 500 | 494 | 460 | 511 | 486 | 489 | 482 | 509 | 464 | 521 | 492 | 479 |

| Run Count | Zeros | Ones | Expected Value |
| --- | --- | --- | --- |
| 1 | 125382 | 124729 | 125000 |
| 2 | 62384 | 62754 | 62500 |
| 3 | 30993 | 31526 | 31250 |
| 4 | 15682 | 15537 | 15625 |
| 5 | 7798 | 7900 | 7812 |
| 6 | 3963 | 3792 | 3906 |
| 7 | 1888 | 1919 | 1953 |
| 8 | 987 | 953 | 976 |
| 9 | 468 | 508 | 488 |
| 10 | 279 | 250 | 244 |
| 11 | 124 | 110 | 122 |
| 12 | 74 | 58 | 61 |
| >12 | 70 | 56 | 61 |

TABLE 2

$\mu = 3.9996$, $x = 0.1000000001$, $\chi^2 = 245.9$
lower limit = 0.49, upper limit = 0.51
Mono bit = 0.5000 First Delta = 0.4999 Second Delta = 0.4998 Third delta = 0.4997

|     | 0:  | 1:  | 2:  | 3:  | 4:  | 5:  | 6:  | 7:  | 8:  | 9:  | A:  | B:  | C:  | D:  | E:  | F:  |
| --- | --- | --- | --- | --- | --- | --- | --- | --- | --- | --- | --- | --- | --- | --- | --- | --- |
| 0:  | 510 | 476 | 495 | 488 | 502 | 474 | 513 | 505 | 475 | 486 | 479 | 488 | 466 | 503 | 500 | 520 |
| 10: | 489 | 500 | 468 | 507 | 510 | 471 | 454 | 490 | 448 | 494 | 531 | 462 | 511 | 495 | 476 | 503 |
| 20: | 479 | 519 | 503 | 484 | 491 | 499 | 479 | 508 | 474 | 527 | 520 | 484 | 478 | 487 | 522 | 478 |
| 30: | 510 | 504 | 508 | 470 | 479 | 477 | 461 | 443 | 522 | 472 | 422 | 471 | 473 | 474 | 498 | 488 |
| 40: | 486 | 493 | 530 | 484 | 494 | 468 | 470 | 469 | 484 | 467 | 525 | 531 | 464 | 476 | 445 | 499 |
| 50: | 495 | 466 | 482 | 516 | 495 | 503 | 455 | 494 | 488 | 492 | 479 | 506 | 493 | 508 | 500 | 529 |
| 60: | 460 | 492 | 517 | 484 | 516 | 476 | 526 | 529 | 506 | 465 | 483 | 493 | 500 | 453 | 514 | 488 |
| 70: | 478 | 538 | 509 | 474 | 470 | 501 | 505 | 487 | 457 | 478 | 490 | 472 | 510 | 501 | 455 | 496 |
| 80: | 487 | 455 | 457 | 502 | 508 | 504 | 491 | 477 | 498 | 501 | 466 | 466 | 490 | 517 | 491 | 462 |
| 90: | 501 | 485 | 448 | 514 | 472 | 508 | 497 | 474 | 478 | 472 | 500 | 506 | 444 | 469 | 484 | 485 |
| A0: | 495 | 484 | 436 | 494 | 489 | 498 | 506 | 527 | 467 | 441 | 496 | 469 | 494 | 448 | 459 | 495 |
| B0: | 480 | 492 | 519 | 527 | 468 | 514 | 476 | 491 | 482 | 484 | 513 | 508 | 492 | 527 | 528 | 466 |
| C0: | 487 | 496 | 483 | 503 | 484 | 470 | 490 | 510 | 489 | 468 | 467 | 510 | 487 | 494 | 530 | 476 |
| D0: | 488 | 477 | 465 | 497 | 471 | 486 | 451 | 447 | 488 | 494 | 497 | 423 | 507 | 492 | 486 | 501 |
| E0: | 488 | 473 | 458 | 534 | 491 | 502 | 468 | 462 | 513 | 456 | 521 | 505 | 476 | 528 | 538 | 457 |
| F0: | 457 | 426 | 487 | 491 | 495 | 482 | 467 | 506 | 496 | 491 | 497 | 466 | 456 | 487 | 480 | 491 |

| Run Count | Zeros | Ones | Expected Value |
| --- | --- | --- | --- |
| 1 | 125217 | 124825 | 125000 |
| 2 | 62411 | 62582 | 62500 |
| 3 | 31137 | 31624 | 31250 |
| 4 | 15725 | 15312 | 15625 |
| 5 | 7718 | 8016 | 7812 |
| 6 | 3955 | 3872 | 3906 |
| 7 | 1920 | 1914 | 1953 |
| 8 | 1016 | 965 | 976 |
| 9 | 444 | 480 | 488 |
| 10 | 269 | 245 | 244 |
| 11 | 118 | 93 | 122 |

TABLE 2-continued

| | | | |
|---|---|---|---|
| 12 | 65 | 72 | 61 |
| >12 | 67 | 62 | 61 |

TABLE 3

The output from a DoD approved random source. $\chi^2 = 283.2$
Mono bit = 0.4994  First Delta = 0.5001  Second Delta = 0.5002  Third delta = 0.4997

| | 0: | 1: | 2: | 3: | 4: | 5: | 6: | 7: | 8: | 9: | A: | B: | C: | D: | E: | F: |
|---|---|---|---|---|---|---|---|---|---|---|---|---|---|---|---|---|
| 0: | 514 | 433 | 497 | 502 | 488 | 545 | 508 | 505 | 498 | 485 | 502 | 470 | 505 | 512 | 495 | 505 |
| 10: | 528 | 526 | 469 | 516 | 502 | 468 | 499 | 459 | 466 | 517 | 497 | 492 | 479 | 510 | 464 | 508 |
| 20: | 516 | 511 | 508 | 471 | 486 | 496 | 474 | 453 | 473 | 486 | 516 | 482 | 481 | 528 | 484 | 489 |
| 30: | 508 | 465 | 478 | 493 | 482 | 479 | 510 | 481 | 522 | 488 | 484 | 483 | 510 | 484 | 466 | 481 |
| 40: | 463 | 444 | 474 | 509 | 495 | 472 | 484 | 504 | 510 | 486 | 461 | 484 | 510 | 473 | 493 | 467 |
| 50: | 473 | 487 | 473 | 440 | 529 | 518 | 529 | 460 | 500 | 516 | 498 | 507 | 452 | 506 | 534 | 482 |
| 60: | 453 | 485 | 490 | 515 | 460 | 496 | 426 | 505 | 492 | 498 | 477 | 483 | 463 | 550 | 443 | 479 |
| 70: | 503 | 496 | 485 | 462 | 462 | 535 | 490 | 478 | 475 | 462 | 455 | 515 | 517 | 483 | 504 | 475 |
| 80: | 485 | 507 | 520 | 480 | 499 | 490 | 487 | 461 | 465 | 467 | 449 | 478 | 460 | 500 | 509 | 478 |
| 90: | 488 | 470 | 445 | 445 | 457 | 481 | 511 | 466 | 485 | 468 | 517 | 491 | 469 | 464 | 471 | 461 |
| A0: | 483 | 472 | 450 | 511 | 497 | 476 | 498 | 493 | 519 | 473 | 497 | 501 | 500 | 482 | 520 | 532 |
| B0: | 529 | 492 | 499 | 511 | 458 | 474 | 465 | 521 | 504 | 463 | 512 | 491 | 451 | 451 | 441 | 488 |
| C0: | 488 | 482 | 498 | 486 | 451 | 468 | 539 | 491 | 525 | 472 | 498 | 521 | 468 | 497 | 478 | 488 |
| D0: | 537 | 495 | 538 | 510 | 509 | 484 | 510 | 492 | 523 | 499 | 479 | 481 | 464 | 458 | 474 | 496 |
| E0: | 482 | 472 | 474 | 502 | 488 | 469 | 499 | 510 | 504 | 489 | 504 | 463 | 466 | 450 | 498 | 510 |
| F0: | 494 | 475 | 479 | 500 | 497 | 425 | 517 | 488 | 486 | 484 | 458 | 513 | 510 | 529 | 473 | 438 |

| Run Count | Zeros | Ones | Expected Value |
|---|---|---|---|
| 1 | 125202 | 124815 | 125000 |
| 2 | 61970 | 62780 | 62500 |
| 3 | 31231 | 31416 | 31250 |
| 4 | 15720 | 15366 | 15625 |
| 5 | 7880 | 7767 | 7812 |
| 6 | 4062 | 3918 | 3906 |
| 7 | 1946 | 1951 | 1953 |
| 8 | 996 | 998 | 976 |
| 9 | 492 | 505 | 488 |
| 10 | 234 | 218 | 244 |
| 11 | 115 | 99 | 122 |
| 12 | 49 | 65 | 61 |
| >12 | 70 | 52 | 61 |

Thus there has been described a new and improved encryption system that is implemented using the concepts of Chaos theory. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

APPENDIX I

| Code | Comments |
|---|---|
| BEGIN | |
| get_key; | {key contains fields for $\mu$, {upper_limit, lower_limit. run-up |
| midpoint: = (upper_limit + lower_limit)/2 | {calculate midpoint |
| randomize; | {call a routine to generate a random {starting point |
| x: = random_value; | {assign random value as the initial value |
| for temp = 0 to run_up | {initialize by iterating for the amount {specified by run-up |
| x: = $\mu$ * x − $\mu$ * x * x; | |
| repeat | {repeat for entire message |
| repeat | {iterate until x is between lower and {upper limits |
| x: = $\mu$ * x − $\mu$ * x * x; | |
| until (x > lower_limit) and (x < upper_limit) | |
| if x > midpoint then keystream: = 1 | {convert to binary |
| else keystream: = 0; | |
| output: = keystream XOR data; | {encrypt |
| until end of message; | {done |
| END | |

What is claimed is:

1. A cryptographic system comprising:
   a random number generator;
   a memory for storing one or more cryptographic keys;
   an arithmetic means coupled to the random number generator and memory for iterating a predetermined logistic difference equation having the form $x_{n+1} = \mu x_n(1-x_n)$, where $\mu$ is a cryptographic key, $x_n$ is a random number generated by the random number generator, and $x_{n+1}$ is an iterated result generated by succesively calculating $x_{n+1}$ in the above equation a selected number of successive times. to thereby generate a sequence of encrypting iterates, and for converting the sequence of encrypting iterates into binary form;

adder means coupled to the arithmetic means for summing the encrypting iterates with digital data to thereby generate encrypted data; and controller means for controlling the operation of and transfer of data between the random number generator, the memory, the arithmetic means, and the adder means.

2. The system of claim 1 wherein the arithmetic means comprises:

means for adjusting the mathematical precision of the random number generator to adjust the sequence of encrypting iterates.

3. The system of claim 1 wherein the arithmetic means comprises:

means for feeding back the encrypted data;

means for summing the encrypted data with the sequence of encrypting iterates to generate a second sequence of encrypting iterates;

means for delaying the second sequence of encrypting iterates for a selected time period; and means for summing the delayed second sequence of encrypting iterates with digital data to be encrypted to generate additional encrypted data.

4. A method of encrypting data comprising the steps of:

calculating a value to be used as a random starting point;

generating an intitial state of a predetermined logistic difference equation having the form $x_{n+1}=\mu x_n(1-x_n)$, where $\mu$ is a cryptographic key, $x_n$ is the random starting point, and $x_{n+1}$ is an iterated result;

iterating the logistic differnce equation by using successive $x_{n+1}$ values to $x_n$ and repeating the calculation a selected number of times, the random value $x_n$ and the key value $\mu$ having a selected mathematical precision, for a selected number of iterations to thereby generate a sequence of encrypting iterates;

converting the encrypting iterates into binary form; and summing the encrypting iterates in binary form with digital data to generate encrypted data.

5. The method of claim 4 wherein the step of iterating the logistic difference equation further comprises the step of:

reiterating the logistic difference equation until the encrypting iterates are within a selected range.

6. The method of claim 4 wherein the step of iterating the logistic difference equation further comprises selecting a desired floating point mathematical precision for the iterating process to alter the sequence of encrypting iterates.

7. The method of claim 4 wherein the step of iterating the logistic difference equation further comprises the steps of:

summing previously encrypted data with new encrypting iterates in binary form to generate a second set of encrypting iterates in binary form;

delaying the second set of encrypting iterates in binary form for a selected time period; and summing the delayed second set of encrypting iterates in binary form with digital data to be encrypted to generate additional encrypted data.

8. A method of decrypting data encrypted in accordance with the method of claim 4, said method comprising the steps of:

receiving encrypted data that is to be decrypted;

receiving a value used as a random starting point;

calculating an initial state of the logistic difference equation having the form $x_{n+1}=\mu x_n(1-x_n)$, where $\mu$ is a cryptographic key, $x_n$ is the random starting point, and $x_{n+1}$ is an iterated result;

iterating the logistic difference equation by assigning successive finite values to $x_n$ and repeating the calculation a selected number of times to thereby generate a sequence of encrypting iterates;

converting the iterated values into binary form; and summing the iterated values in binary form with the encrypted data to be decrypted to generate decrypted data.

9. The method of claim 8 wherein the step of iterating the logistic difference equation further comprises the step of:

reiterating the the logistic difference equation until the iterated results are within a selected range.

10. The method of claim 8 wherein the step of iterating the logistic difference equation further comprises the steps of:

summing the encrypted data with the sequence of decrypting iterates in binary form to generate a second set of decrypting iterates in binary form;

delaying the second set of decrypting iterates in binary form for a selected time period; and summing the delayed second set of decrypting iterates in binary form with encrypted data to be decrypted to generate additional decrypted data.

11. A cryptographic system comprising:

random starting point generator means for generating a random starting point;

a memory for storing at least one cryptographic key;

arithmetic logic unit and arithmetic logic unit controller means coupled to the generator means and memory for iterating a predetermined logistic difference equation having the form $x_{n+1}=\mu x_n(1-x_n)$, where $\mu$ is a cryptographic key, $x_n$ is the random starting point, and $x_{n+1}$ is an iterated result, using the random starting point and a cryptographic key, for generating a sequence of iterates, and for converting the sequence of iterates into binary form;

adder means coupled to the arithmetic logic unit and arithmetic logic unit controller means for summing the iterates in binary form with digital data to generate encrypted data; and sequencer means for controlling the operation of and transfer of data between the random starting point generator means, the memory, the arithmetic logic unit and arithmetic logic unit controller means.

12. The system of claim 11 wherein the arithmetic logic unit and arithmetic logic unit controller means comprises:

means for adjusting the mathematical floating point precision of the arithmetic logic unit to adjust the sequence of encrypting iterates.

13. The system of claim 11 wherein the arithmetic logic unit and arithmetic logic unit controller means comprises:

means for summing previously encrypted data with new encrypting iterates in binary form to generate a second set of encrypting iterates in binary form;

means for delaying the second set of encrypting iterates in binary form for a selected time period; and means for summing the delayed second set of encrypting iterates in binary form with data to be encrypted to generate encrypted data.

14. The system of claim 11 wherein the arithmetic logic unit and arithmetic logic unit controller means comprises:

means for iterating the logistic difference equation and converting the result into binary form a selected number of times; and means for summing the encrypting iterates in binary form with digital data to be encrypted to generate encrypted data.

* * * * *

UNITED STATES PATENT AND TRADEMARK OFFICE
CERTIFICATE OF CORRECTION

PATENT NO. : 5,048,086

DATED : September 10, 1991

INVENTOR(S) : Mark E. Bianco and Dana A. Reed

It is certified that error appears in the above-identified patent and that said Letters Patent is hereby corrected as shown below:

Column 11, line 47, after "digital data to", insert --be encrypted to--.

Signed and Sealed this

Twenty-third Day of March, 1993

Attest:

STEPHEN G. KUNIN

*Attesting Officer*    Acting Commissioner of Patents and Trademarks